United States Patent Office 3,804,799
Patented Apr. 16, 1974

3,804,799
METAL-AMINE COMPLEX ACCELERATOR FOR
POLYESTER RESIN CURING
Melville W. Uffner, Glen Mills, Pa., assignor to Air Products and Chemicals, Inc., Wayne, Pa.
No Drawing. Filed Sept. 1, 1972, Ser. No. 285,907
Int. Cl. C08g 17/16
U.S. Cl. 260—40 R                 12 Claims

ABSTRACT OF THE DISCLOSURE

Salts of cobalt and/or other metals such as zinc and nickel form complexes with triethylene diamine compounds which are useful in accelerating free-radical initiated curing and cross linking of unsaturated polyester resins.

BACKGROUND OF THE INVENTION

The present invention pertains to curing of unsaturated polyester resins in admixture with vinyl monomers and is particularly concerned with promoting or accelerating the cross-linking of such polyester with the vinyl monomer during curing while retaining desired long shelf life during storage of the premix at ambient room temperatures.

The copolymerization of unsaturated polyester resins with vinyl monomers in the presence of free-radical generating compounds such as organic peroxides is well known in the art. Among the vinyl monomers suggested or employed are: methyl methacrylate, vinyl chloride, vinyl acetate, vinyl toluene, and styrene; the last named being largely preferred. The unsaturated polyesters are obtained by reacting one or more dihydric alcohols with an unsaturated dibasic carboxylic acid such as cis-butene-dioic acid (maleic acid) or its anhydride or trans-butene-dioic acid (fumaric) or mixtures of these, sometimes in the presence of a saturated dicarboxylic acid such as phthalic or isophthalic. The monomer may comprise 30 to 70% by weight of the admixture with the unsaturated polyester.

A wide range of organic peroxide catalysts, called "initiators," are known and have been commercialy employed for the polymerization of unsaturated polyesters and their copolymerization with vinyl monomers. These function by way of undergoing cleavage of the peroxide linkage to form highly active free radicals which initiate the polymerization reaction. These peroxide initiators vary widely as to the temperature at which they initially undergo cleavage and as to the rate of decomposition to provide free radicals at any given temperature. Accelerators, also called promoters, are frequently used to speed up free radical formation from the peroxide at lower temperatures, particularly in connection with formulations intended to be cured at or about room temperature.

Among the more frequently suggested and more widely used accelerators are dimethyl aniline and cobalt naphthenate. Cobalt naphthenate and other metallic soaps generally are proposed for use with ketone peroxides in cold cure formulations. While dimethyl aniline is known to accelerate benzoyl peroxide at room to moderate temperatures, cobalt naphthenate does not do so. On the other hand, neither of these promoters is effective with t-butyl peroctoate at room temperature. It is possible to obtain reduced gel and cure times at elevated temperature in polyester systems employing t-butyl peroctoate initiator by the use of certain promoters, dimethylaniline being more effective for this purpose than cobalt naphthenate.

A wide use of unsaturated polyester-styrene copolymer systems is in sheet molding compound (SMC) and bulk molding compound (BMC) which comprise the resin reinforced with glass fibers and which generally contain fillers and thickeners. These systems employ initiators that decompose at higher temperatures and further necessitate longer term storage stability than the general purpose resins. While by the inclusion of effective promoters the gel and cure time of such fibrous glass reinforced plastics can be accelerated, these accelerators generally have an adverse effect on required storage stability of the uncured system. Moreover, most BMC and SMC formulations also include a thermoplastic resin, such as an acrylic polymer, to reduce shrinkage during cure. These acrylic polymers are incompatible with the unsaturated polyester and phase rapidly after blending, often resulting in an undesirable mottled surface of the cured product particularly accentuated when the cure is accelerated.

Typical formulations for bulk molding and sheet molding mixes are set out below.

| Resin system | P.b.w. BMC | P.b.w. SMC |
|---|---|---|
| 60 parts polyester resin; 40 parts acrylic polymer, each dissolved in styrene monomer. | 25 | 28 |
| Filler (such as calcium carbonate) | 55 | 42 |
| Catalyst | <1 | <1 |
| Thickener (magnesium hydroxide) | <1 | <1 |
| Glass reinforcement | 20 | 30 |

Among favored peroxide catalysts employed are t-butyl perbenzoate and/or t-butyl peroctoate and sometimes blends of either or both of these with a "hotter" initiator such as benzoyl peroxide. Depending in part upon the particular catalyst or mixture of catalysts used these may constitute about 0.5 to 2.0 percent by weight of resin in the formulation. The thickening agent is generally about 2–3% by weight of the resin component. A lubricant, such as zinc stearate (1–2%) is generally included in BMC and SMC compositions.

OBJECTS OF THE INVENTION

Among the objectives of the present invention is the provision of a novel accelerator for use in peroxide initiated co-polymerization of unsaturated polyester-vinyl monomer resin systems, which accelerator is effective in reducing gel and cure time of these resins, while retaining sufficient stability to enable such resin compositions to be stored at ambient temperature for desired periods.

STATEMENT OF THE INVENTION

The novel accelerators or promoters of the invention comprise a polymeric coordination complex of triethylene diamine (diazabicyclo octane) or a homologue thereof with one or more metal salts preferably selected from the group of: cobalt, zinc and nickel salts.

These coordination complexes can be prepared by dissolving the triethylene diamine compound in a glycol or other suitable solvent such as for example styrene. The metal salt is separately but similarly dissolved. Such solution of each of these compounds can be effected at room temperature or above (up to 100° C. or higher if desired). The two solutions are then combined under agitation, optionally with moderate heating, until a smooth homogenous liquid blend is obtained. The stable complex is formed upon cooling to room temperature.

Although the stable metal complexes can be formal over a wide range of molar ratios of metal to heterocyclic base, it has been found that those which contain one or more mols of the triethylene diamine compound per mol of metal obtain optimum shelf life for the promoted polyester resin system.

The preferred complex is one prepared from either cobalt chloride or cobalt acetate and triethylene diamine (TEDA). Preparation of a stable complex from equal molar parts of these is illustrated in Example 1 below.

Example 1

24.2 parts of $CoCl_2 \cdot 6H_2O$ were dissolved in 100 grams of dipropylene glycol at 100° C. Separately, 11.4 parts of triethylene diamine (DABCO®) were dissolved in 64.4 parts of dipropylene glycol at 100° C. The metal salt solution was then slowly added to the triethylene diamine solution with agitation at 100° C. Stirring at that temperature was continued for four hours obtaining a smooth homogeneous blend, which was then permitted to cool to room temperature forming the stable complex. For cobalt acetate the preferred solvent is ethylene glycol or glycerol with or without DPG.

Triethylene diamine has the formula

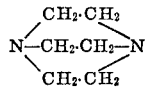

It is available commerciallly (under the registered trademark DABCO) from Air Products and Chemicals, Inc. Its preparation is described in U.S. Pat. No. 2,937,176. The preparation of several homologues of triethylene diamine, including the 2-methyl and 2,4 dimethyl compound, is described in U.S. Pat. No. 3,167,518.

In manner similar to that set out in Example 1 other metal complexes of triethylene diamine or its homologues can be prepared, for example with salts of nickel, of zinc, or mixtures of one or more of these with cobalt salts.

For use in polyester resin formulations, it is not necessary to prepare the metal complex of the TEDA compound in advance. The metal salt or salts and the TEDA compound can be separately incorporated in the resin formulation in desired proportions and the metal complex will be formed, at least in part, in situ during blending and standing of the resin mixture.

Whether in the pre-complexed form or in intimate admixture with the metal salt the TEDA compound shields or hinders the metal from activity so that it remains latent. Upon application of heat, as during curing, the metal is set free to promote decomposition of the peroxide free-radical initiator, thereby accelerating the cure.

It has been found that the incorporation of the mixture or complex of the TEDA compound and the metal salt into peroxide initiated BMC and SMC results in a premix:

(1) which does not readily separate into phases
(2) has a prolonged shelf life
(3) cures more rapdily at lower temperature
(4) does not gel prematurely
(5) shows improved wetting of an adhesion to the glass reinforcements.

A portion of the TEDA or TEDA homologue in the mixture or complex with the metal salt can be substituted by another tertiary amine, for example by dimethyl ethanolamine or phenylethylethanolamine. However, the TEDA compound should be no less than 25% of total tertiary amines and preferably 75% or more. The amines should be present in at least 1:1 molar ratio to the metal to assure effective shielding. For extended shelf life at least one mol of TEDA compound per mol of metal promoter is advocated.

By judicious selection of one or more metal salts and/or the tertiary amine combination, within limits, the peak exotherm obtained in the course of reacting the premix can be raised or lowered as desired. A low peak exotherm is desirable when thick sections are molded, to prevent stresses and crazing; whereas in low profile moldings, a high exotherm results in a desirable glossy finish.

The TEDA-metal complex or the mixture of components entering into such complex is effective in promoting curing and crosslinking of unaturated polyester resin mixtures when such promoter is employed in amounts even less than 1% by weight of the resin, as from 0.2 to 0.8%. Higher amounts appear to have no deleterious effect.

Typical compositions for bulk or sheet molding may comprise:

| | |
|---|---|
| 60 parts unsat. polyester resin in styrene; 40 parts thermoplastic resin in styrene __parts by weight | 25–30 |
| $CaCO_3$ filler _____do____ | 40–55 |
| Lubricant (zinc stearate) _____do____ | 1–2 |
| Glass reinforcement, ¼" chopped strand do____ | 10–30 |
| TEDA/metal complex _____phr__ | 0.2–0.8 |
| Thickener, $Mg(OH)_2$ _____phr__ | 2–3 |
| Catalyst (t-butyl perbenzoate) _____phr__ | 0.8–1.2 |

These materials are blended in a heavy duty kneader to effect thorough homogeneity. The blended charge (premix) is then matured for several days, cut to convenient size, molded and cured at 250–325° F. for a short time, usually one to three minutes.

To determine the performance characteristics of various combinations and different amounts of the TEDA/metal complex as compared to controls free of complex, a series of runs were carried out on basic resin mixtures (neat) without filler, thickener, lubricant, and glass reinforcement.

(a) Gel time, rate of the cure and peak exotherm of the composition were determined by the standard Block Test Method using SP1 Procedure for Running Exotherm Curves (Preprint for the 24th Annual Techical Conference, 1969; Reinforced Plastics/Composites Division; The Society of Plastics Industry).

(b) Shelf-life stability was determined by storing 100 gram charges of each of the neat compositions in capped jars at ambient room temperature immediately after compounding. The jars were inverted at least once a day until gelation occurred, as evidenced by failure of the composition to flow. The number of days of gelation was recorded as shelf-life.

The shelf life exhibited in the foregoing test is only about one-third of that obtained in practice with the full composition including fillers, reinforcement, etc., so that it can be expected to obtain three times the shelf-life reported in the tests below.

The tests were conducted on a commercial resin mixture composed of 60 parts Paraplex P-340 and 40 parts Paraplex P-681 (Rohm and Haas Company). The P-340 resin is a styrene solution of a highly reactive polyester resin made from glycols (7.3 mols propylene to 0.7 ethylene) with cis- and trans-butenedioic acid, containing a small amount of free butenedioic acid. The sample contained 65–70 parts of the polyester and 35–30 parts styrene. The physical properties of P-340 are given, as:

| | |
|---|---|
| Brookfield viscosity, RVF #2 spindle, 2 r.p.m. cps__ | 1070 |
| Acid number _____ | 22.5 |
| Color, VCS _____ | 2 |
| Specific gravity, 25° C. _____ | 1.114 |
| Solids _____percent__ | 65.6 |

The P-681 resin comprises about 35 parts polymethylmethacrylate and 65 parts styrene. It has a Brookfield viscosity of 1320, a specific gravity of 0.98 and a solids content of 33.2%.

For comparison, control runs were separately carried out on the resin mixture (60 parts P-340 and 40 parts P-681) with t-butyl perbenzoate (1.0 phr.) initiator and with a mixed initiator (1.0 phr.) system comprising equal parts of t-butyl perbenzoate and 50% t-butyl peroctoate in dioctylphthalate. The results of which are reported in Table I below:

TABLE I

| | Run A[1] | | | Run B[2] | | |
|---|---|---|---|---|---|---|
| Block temp., ° F | 250 | 275 | 305 | 250 | 275 | 305 |
| Gel time, min | 3.7 | 2.1 | 1.5 | 1.15 | 0.75 | 0.60 |
| Cure time, min | 4.3 | 2.5 | 1.9 | 1.5 | 1.20 | 0.95 |
| Peak exotherm, ° F | 360 | 350 | 350 | 355 | 325 | 390 |
| Shelf life, days at R.T | | 37 | | | 37–40 | |

[1] t-BPB—1%.
[2] t-BPB—½%; t-BPO—½%.

The effect of adding the promoter according to the invention will be seen from the runs reported in Table II below:

Example 2

The promoter employed was prepared by dissolving 11.4 parts of triethylene diamine and 24.2 parts of cobalt chloride ($CoCl_2 \cdot 6H_2O$) in 164.4 parts of dipropylene glycol (1/1 molar ratio of Co to TEDA). The promoter solution was added to the same commercial resin as in the preceding runs (A & B) using 1 part catalyst to 100 parts resin mixture and 0.4 parts of promoter (equivalent to 0.012 cobalt plus 0.023 TEDA).

The composition was tested by the Block Test and for shelf life stability in Run C below. For comparison compositions having the same resin and initiator but containing TEDA alone and cobalt salt alone were tested in Runs D & E respectively. In Run D the composition contained 11.4 parts of TEDA dissolved in propylene glycol per 100 parts of resin (equivalent to 0.023 TEDA). In Run E there was employed a solution of cobalt chloride (3% cobalt) in propylene glycol of which 0.4 part by weight were used per hundred parts resin (equivalent to 0.012 cobalt). The results of these tests are shown in Table II below:

TABLE II

| | Promoter | | | | | | |
|---|---|---|---|---|---|---|---|
| | Run C, Co/TEDA | | | Run D, TEDA | | | Run E, $CoCl_2 \cdot 6 H_2O$ |
| Block, temp., °F | 250 | 275 | 305 | 250 | 275 | 305 | 305 |
| Gel time, min | 1.8 | 1.2 | 1.15 | 3.1 | 2.2 | 1.3 | 0.5 |
| Cure time, min | 2.2 | 1.6 | 1.4 | 3.5 | 2.3 | 1.6 | 0.8 |
| Peak exotherm, °F | 325 | 345 | 335 | 365 | 345 | 365 | 350 |
| Shelf life, days at R.T | >37 | | | | 90 | | 1–2 |

Comparing these runs with Run A (Table I) it will be seen that TEDA used alone (Run D) does not change gel and cure time appreciably but more than doubles shelf life as compared with the control. While cobalt salt used alone (Run E) does significantly reduce gel and cure time, the shelf life is very poor. Moreover too fast a gel time is to be avoided, because there may not be sufficient time available for the mold to fill out. The Co/TEDA complex (Run C) shortens gel and cure times while improving shelf life.

Example 3

In this test (Run F) a cobalt naphthenate solution (6% cobalt) was employed in an amount of 0.2 part per hundred parts resin (equivalent to 0.012 cobalt). The gel and cure times were faster than in the control (Run A) but the shelf life was short as compared to Run C. The results are reported in Table III.

TABLE III

| Promoter | Run F—Co naphthenate | | |
|---|---|---|---|
| Block temp., °F | 250 | 275 | 305 |
| Gel time, min | 1.1 | 0.7 | 0.65 |
| Cure time, min | 1.4 | 0.95 | 1.0 |
| Peak exotherm, °F | 350 | 330 | 355 |
| Shelf life, days at R.T | | 16–19 | |

Example 4

In this series of runs the promoter employed contained a complex of TEDA with cobalt chloride and zinc chloride or these salts with an amine mixture of TEDA and dimethylethanolamine. The several compositions are outlined below:

PROMOTER COMPOSITION

| | Run | | |
|---|---|---|---|
| | G | H | J |
| $CoCl_2 \cdot 6 H_2O$, wt./mols | 24.2/1 | 24.2/1 | 24.2/1 |
| $ZnCl_2$, wt./mols | 6.9/0.5 | 13.8/1 | 6.9/0.5 |
| TEDA, wt./mols | 11.4/1 | 11.4/1 | 11.4/1 |
| DMEA, wt./mols | 4.5/0.5 | | *14.1/0.5 |
| Dipropylene glycol | 153.0 | 150.6 | 143.4 |
| Promoter, phr | 0.4 | 0.4 | 0.4 |

*As dimethyl ethanolamine o-formate.

The test runs on these compositions are outlined in Table IV below:

TABLE IV

| Metal equivalent: | Run G | | Run H | | Run J | |
|---|---|---|---|---|---|---|
| Co | 0.012 | | 0.012 | | 0.012 | |
| Zn | 0.006 | | 0.012 | | 0.006 | |
| Block temp., °F | 250 | 275 | 305 | 250 | 275 | 305 |
| Gel time, min | 1.6 | 1.0 | 0.6 | 1.7 | 1.2 | 1.05 |
| Cure time, min | 2.0 | 1.3 | 1.0 | 2.1 | 1.5 | 1.35 |
| Peak exotherm, °F | 315 | 325 | 350 | 325 | 320 | 345 |
| Shelf life, days at R.T | 17–19 | | 4–7 | | 15–18 | |

Comparing Runs G & J with the control (Run A) it will be seen that by use of the metal complex promoter of the invention gel times and cure times were faster at lower temperature and peak exotherms were lowered. Substituting part of the TEDA by DMEA to obtain 1 mole amine to 1 mole metal in these runs does not substantially affect the activity of the promoter in speeding up gel and cure times (compared with Runs A and C). The shelf life in Runs G and J while lower than that obtained in Run C, is still satisfactory for most purposes. Run H demonstrates the effect of using insufficient amine to shield the metal; the shelf life of the resin mixture is considerably shortened.

The use alone of tertiary amines other than TEDA compounds mixed or complexed with cobalt salts does not obtain the promoter effect demonstrated by the practice of the invention as will appear from Example 5 below. In fact, the ineffectiveness of these other tertiary amines becomes evident when too much thereof is substituted for TEDA in the metal complex.

Example 5

In this series of runs the same neat resin composition and initiator was used as in preceding runs (A, C, etc.) with the hereinafter indicated promoters in amount equivalent to 0.012 cobalt.

| | Run | | |
|---|---|---|---|
| Promoter composition | K | L | M |
| $CoCl_2.6H_2O$, wt./mol | 24.2/1 | 24.2/1 | 24.2/1 |
| DMEA, wt./mol | 8.9/1 | 4.5/0.5 | *28.2/1 |
| TEDA, wt./mol | | 5.7/0.5 | |
| DPG, wt | 166.9 | 165.6 | 147.6 |

*As dimethylethanolamine o-formate.

The test results are reported in Table V below:

TABLE V

| | Run | | |
|---|---|---|---|
| | K | L | M |
| Block temp., °F | 305 | 305 | 305 |
| Gel time, min | 0.65 | 0.62 | 1.1 |
| Cure time, min | 0.95 | 0.95 | 1.3 |
| Peak exotherm, °F | 390 | 380 | 370 |
| Shelf life, days at R.T | 2–3 | 10–11 | 7–8 |

To obtain the desired full effect of accelerated gel and cure times while retaining desirable long shelf life, the amine in the amine metal complex or mixture should predominate in TEDA compound and preferably should comprise in the order of 75% or more TEDA compound. As indicated above the molar ratio of total amines to metal salt should be at least 1/1 to prevent premature activation. Higher molar ratios of amine to metal appear to have no deleterious effect. This was demonstrated in a run (Run N) in all other respects similar to Run C except that the molar ratio of cobalt salt to TEDA was 0.5/1. The test results are compared in Table VI below:

TABLE VI

|  | Run | |
|---|---|---|
|  | N | C |
| Co/TEDA, mol ratio | 0.5 | 1 |
| Block temp., °F | 305 | 305 |
| Gel time, min | 1.1 | 1.15 |
| Cure time, min | 1.3 | 1.4 |
| Peak exotherm, °F | 370 | 335 |
| Shelf life, days at R.T | 36 | 37 |

The wide variety of effects obtainable by use of the TEDA-metal complex with selected initiators will be seen from the runs described below. In each of the following runs instead of the t-butyl perbenzoate initiator employed in Runs, A, C, etc., the more active initiator of the control Run B (equal parts of t-butyl perbenzoate and 50% t-butyl peroctoate in DOP) was used. The more active mixed initiator system generally obtained faster gel and cure time than that obtained with the single less active initiator but without substantial difference in shelf life over that obtained with the single initiator. The several promoters used in these runs are described below and the test runs appear in Table VII.

| Promoter composition | Run | | |
|---|---|---|---|
|  | O | P | Q |
| $CoCl_2 \cdot H_2O$, wt./mol | 24.2/1 | 24.2/1 | 24.2/1 |
| $ZnCl_2$, wt./mol | 6.9/0.5 | 6.9/0.5 | 6.9/0.5 |
| TEDA, wt./mol | 17.1/1.5 | 11.4/1 | 11.4/1 |
| DMEA |  | *14.1/0.5 | 4.5/0.5 |
| DPG, wt | 151.8 | 143.4 | 153.0 |

*As dimethyl ethanolamine o-formate.

TABLE VII

|  | Control Run B | Run | | |
|---|---|---|---|---|
|  |  | O | P | Q |
| Block temp., °F | 250 | 275 | 305 | 275 | 275 |
| Gel time, min | 1.15 | 0.75 | 0.60 | 0.7 | 0.5 | 0.85 | 0.6 |
| Cure time, min | 1.5 | 1.20 | 0.95 | 0.95 | 0.8 | 1.20 | 1.0 |
| Peak exotherm, °F | 355 | 325 | 390 | 345 | 385 | 350 | 330 |
| Shelf life, days at R.T |  | 37–40 | | 22–25 | 16–18 | | 16–18 |

While in the foregoing examples the catalyst or initiator employed was t-butyl perbenzoate alone or admixture with t-butyl peroctoate, it will be appreciated that the invention is not limited to the particular free-radical liberating initiator used; the accelerator effects and other general properties exhibited by the proposed metal-amine complex promoter are obtainable with other peroxide promoters. Thus, any of the known commercial free-radical initiating peroxide compounds and others described in the prior art for use in curing, copolymerizing, or cross-linking of unsaturated polyesters, are suitable for use in compositions containing the metal-amine complex promoters of the invention. The term "peroxide" as employed in this field is understood to include the perester compounds. In addition to the initiators employed in the foregoing examples preferred initiators for elevated temperature cure are those active at moderate to high temperature, including benzoyl peroxide, dicumyl peroxide, tetramethylbutyl peroxy-2-ethyl hexanoate, t-butylperoxy-isopropylcarbonate, t-butyl hydroperoxide, and t-butyl peroxyisobutyrate.

The tests in the above examples were carried out with the same systems employing a mixture of unsaturated polyester and vinyl monomer in the presence of a shrink-reducing thermoplastic resin. These basic resin compositions were kept constant in the runs to minimize variables and to facilitate comparison of promoters. The inherent activity of the amine-metal complex also finds use in systems free of such thermoplastic resin; and particularly in systems including one or more unsaturated polyester resins (condensation product of an $\alpha,\beta$-ethylenically unsaturated dicarboxylic acid with a dihydric alcohol) dissolved in a copolymerizable vinyl monomer, and which may contain stabilizers such as hydroquinone.

While other metal salts form metal complexes with TEDA and its homologues, certain of which exhibit promoter activity to some degree in systems containing organic peroxide free-radical initiators, in practice of the invention it is preferred to employ divalent cobalt salts, nickel salts and zinc salts, or combinations of these.

Other tertiary amines can be substituted for DMEA to replace part of the TEDA compound in the complex or its precursor mixture, preferably tertiary amines having further a hydroxyl or carboxyl functional group, for example, phenylethylethanolamine.

The TEDA-metal complexes of the invention, while not limited thereto, are particularly advantageous for use in glass fiber reinforced unsaturated polyester systems of the SMC and BMC types, and which contain filler and thickening components.

TEDA used in combination with cobalt acetate enhanced the gel and cure times as seen from Example 6 below.

EXAMPLE 6

|  | Run | |
|---|---|---|
|  | R | S |
| Metal salt solution: |  |  |
| $CoAc_2 \cdot 4 H_2O$, wt./mol | 12.7/1 | 12.7 |
| Glycerol, wt | 26.0 | 87.3 |
| DPG, wt | 25.0 |  |
| Amine solution: |  |  |
| TEDA, wt./mol | 5.7/1 |  |
| DPG, wt | 30.3 |  |
| Alkylated PVP,¹ wt | 0.3 |  |

¹ Polyvinyl pyrrolidone (20%) with $C_{20}$ alkyl ligands (80%).

To 100 parts of the neat resin mixture heretofore described (Run A) and 1 phr. tertiary butyl perbenzoate, 0.8 part of the metal salt solution were added in Run S, while in Run R 0.8 part of the combined metal salt and amine solutions was employed. The results are reported in Table VIII below.

Alkylated polyvinyl pyrrolidone added to the resin mixture serves as a stabilizer giving smoother dispersion. In glass fiber reinforced resins such as those of the SMC and BMC types it further enhances the wetting of the glass fibers. Runs made with the TEDA/cobalt chloride promoter using this dispersion stabilizer are illustrated in Example 7 below:

|  | Run | |
|---|---|---|
|  | T | U |
| Metal solution: |  |  |
| $CoCl_2 \cdot 6H_2O$, wt./mol | 12.1/1 | 12.1/1 |
| DPG, wt | 46.6 | 50 |
| Alkylated PVP,¹ wt | 2.5 |  |
| Amine solution: |  |  |
| TEDA, wt./mol | 5.7/1 | 5.7/1 |
| DMEA, wt. mol | 2.3/0.5 | 9.0/2 |
| DPG, wt | 28.3 | 21.2 |
| Alkylated PVP,² wt | 2.5 | 2.0 |

¹ Polyvinyl pyrrolidone (80%) with $C_{18}$ alkyl ligands (20%).
² Polyvinyl pyrrolidone (20%) with $C_{20}$ alkyl ligands (80%).

To 100 parts of the neat resin and 1 phr. initiator (equal parts of t-butyl benzoate and 50% solution of t-butyl peroxide in dioctyl phthalate) there was added 0.4 part of the above combined metal and amine solutions. The results of these test runs are given in Table VIII below:

TABLE VIII

|  | Run | | | |
|---|---|---|---|---|
|  | R | S | T | U |
| Block temp., °F | 275 | 275 | 275 | 275 |
| Gel time, min | 0.88 | 1.33 | 0.87 | 0.65 |
| Cure time, min | 1.07 | 1.55 | 1.11 | 0.86 |
| Peak exotherm, °F | 387 | 383 | 389 | 385 |
| Shelf life, days at R.T | >30 | 15 | >15 | >15 |

It will be noted that in Run U, employing 1 mol of TEDA and 2 mols of DMEA per mol of metal promoter, exceedingly fast gel and cure times were obtained without untoward effect on the desirable long shelf life.

Obviously, many other modifications and variations of the invention as hereinabove set forth may be made without departing from the spirit and scope thereof.

What is claimed is:

1. A curable polyester mixture comprising
   (a) an unsaturated polyester of a dihydric alcohol and an alpha-beta ethylenically unsaturated dicarboxylic acid,
   (b) ethylenically unsaturated reactive monomer,
   (c) free-radical initiating organic peroxide, and
   (d) tertiary amine composition comprising 25 to 100% mol of triethylene diamine coordinated at least in part with metal salt as a polymeric coordination complex, and wherein said mixture contains, in coordinated and free form, an amount of tertiary amine at least in equal molar proportion to the metal.

2. A mixture as defined in claim 1 wherein the coordination complex is one obtained by mixing a solution of tertiary amine with a solution of at least one metal salt selected from the group consisting of salts of cobalt, nickel and zinc.

3. A mixture as defined in claim 1 wherein said coordination complex is one formed from a divalent cobalt salt and triethylene diamine.

4. A mixture as defined in claim 1 wherein said coordination complex is one formed from cobaltous and zinc salts with triethylene diamine.

5. A mixture as defined in claim 1 wherein said organic peroxide comprises t-butyl perbenzoate.

6. A mixture as defined in claim 1 wherein said organic peroxide comprises a mixture of t-butyl perbenzoate and t-butyl peroctoate.

7. A curable mixture for bulk or sheet molding, comprising:
   (a) an unsaturated polyester resin compound of an alpha-beta ethylenically unsaturated dicarboxylic acid,
   (b) a reactive vinyl monomer,
   (c) a thermoplastic resin,
   (d) a free radical initiating organic peroxide, and
   (e) a metal coordination complex formed from triethylene diamine and an organic solution of metal salt comprising divalent cobalt salt, the molar ratio of triethylene diamine to metal in said complex being at least 1:1.

8. A mixture as defined in claim 7 wherein said organic solution comprises zinc salt in addition to said cobalt salt.

9. A curable polyester composition comprising:
   (a) a polyester of at least one butenedioic acid with a dihydric alcohol,
   (b) styrene,
   (c) thermoplastic acrylic resin,
   (d) free-radical initiator compound,
   (e) metal coordination complex of triethylene diamine with cobalt salt, said complex having said triethylene diamine in an amount at least of equimolar proportion to said cobalt salt,
   (f) thickening agent, and
   (g) glass reinforcement fibers.

10. A curable polyester composition comprising:
    (a) polyester of at least one butenedioic acid with dihydric alcohol,
    (b) styrene,
    (c) polymethylmethacrylate,
    (d) free-radical initiating organic peroxide, and
    (e) a promoter for said peroxide formed by dissolving cobalt salt and triethylene diamine compound in organic solvent, said triethylene diamine being present in an amount of at least equimolar proportion to said cobalt salt.

11. Composition as defined in claim 10 wherein said organic solvent comprises propylene glycol.

12. Composition as defined in claim 10 wherein said peroxide is selected from the group consisting of benzoyl peroxide, t-butyl perbenzoate, t-butyl peroctoate, and mixtures of these.

References Cited
UNITED STATES PATENTS

| | | | |
|---|---|---|---|
| 3,649,576 | 3/1972 | Stapfer | 260—863 X |
| 3,644,612 | 2/1972 | Meyer et al. | 260—863 X |
| 3,227,665 | 1/1966 | Fourcode et al. | 260—863 X |

MORRIS LIEBMAN, Primary Examiner

S. M. PERSON, Assistant Examiner

U.S. Cl. X.R.

260—863, 873